Sept. 9, 1947. B. S. ELLEFSON 2,426,990
HEADER FOR ELECTRON TUBES AND THE LIKE AND METHOD OF MANUFACTURE
Filed Sept. 3, 1943 3 Sheets-Sheet 1
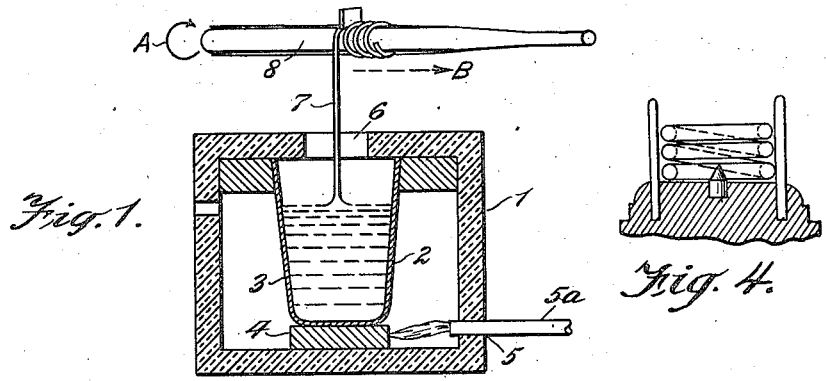
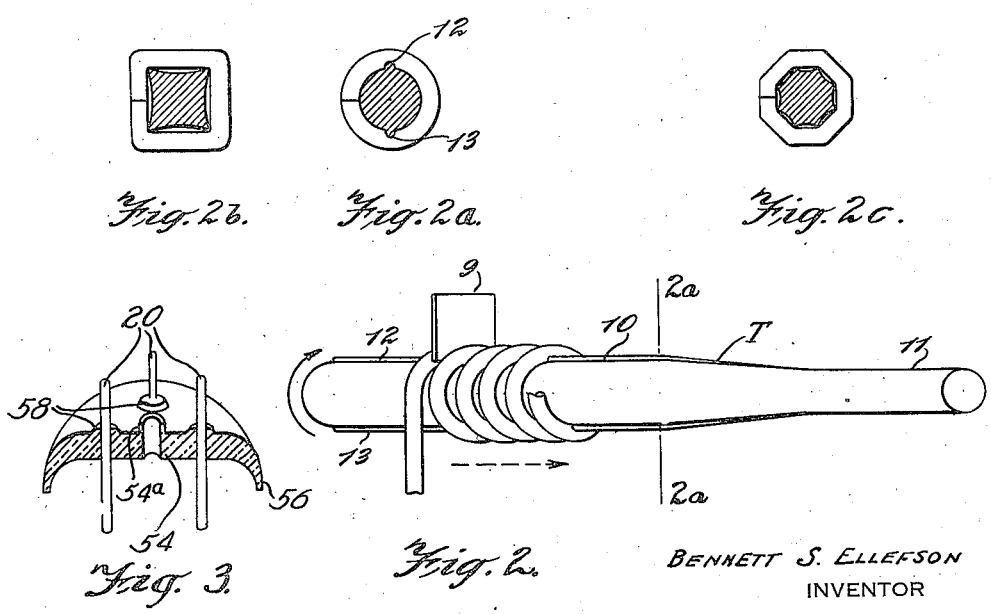
BENNETT S. ELLEFSON
INVENTOR
BY John J. Logan
ATTORNEY Sept. 9, 1947.　　　　B. S. ELLEFSON　　　　2,426,990
HEADER FOR ELECTRON TUBES AND THE LIKE AND METHOD OF MANUFACTURE
Filed Sept. 3, 1943　　　3 Sheets-Sheet 2

BENNET S. ELLEFSON
INVENTOR

BY John J. Rogan
ATTORNEY

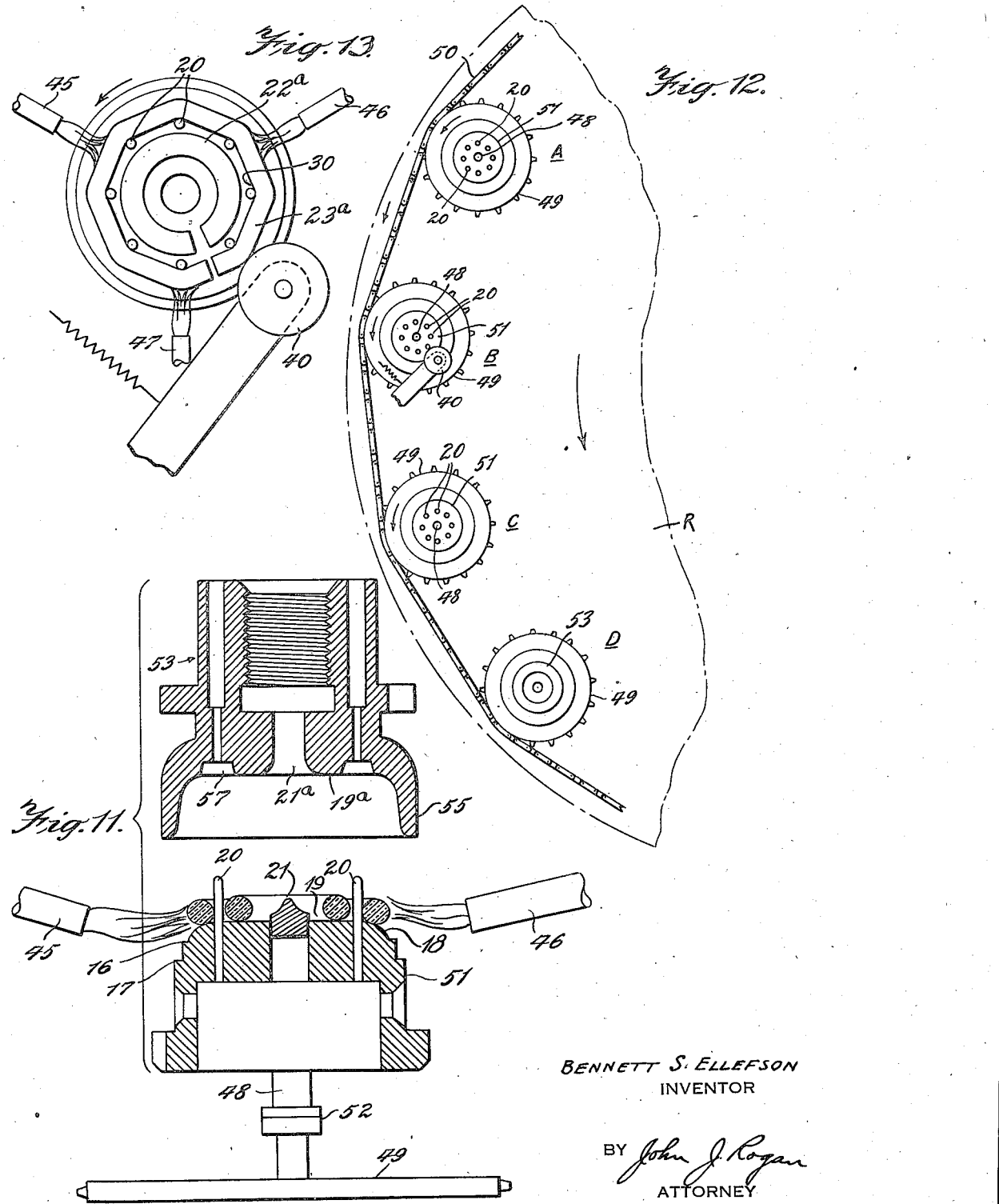

Patented Sept. 9, 1947

2,426,990

UNITED STATES PATENT OFFICE 2,426,990

HEADER FOR ELECTRON TUBES AND THE LIKE AND METHOD OF MANUFACTURE

Bennett S. Ellefson, Emporium, Pa., assignor to Sylvania Electric Products Inc., Emporium, Pa., a corporation of Massachusetts Application September 3, 1943, Serial No. 501,048

8 Claims. (Cl. 49—78)

1

This invention relates to glass articles and in particular to a method of making glass headers such as those used in radio tubes and similar articles.

It is a principal object of the invention to devise a method for making disc and cup-shaped glass headers with a number of vacuum tight sealed-in metal leads.

Another object is to provide a method of manufacturing contact headers for radio tubes and the like with contact prongs sealed directly therethrough. The glass of the header, according to one phase of the invention, is formed from polygonal shaped glass rings or from a glass ring having one or more indentations on its inner periphery, or some form of recess, for registry and positive cooperation with the contact pins. The term recess as used in reference to a portion of a glass ring is intended to generically describe indentations in the glass, the interior angle of angularly related surfaces of a polygonal glass ring, as well as any deviation from the circular which is adapted to receive a pin, whereby a pin in the recess, when moved in a circular path concentric with the ring, will drive the ring with it. The term internal recess is defined here as a portion of the inner surface of the ring which is farther from the center of the ring than the peripherally flanking portions of the ring, and extends to internal indentations, interior angles of polygonal rings, and the like.

A further object is to provide an improved glass header with integrally sealed rigid pins or contact prongs, the header being formed from one or more glass rings having at least one recess on the internal periphery for registry with a contact prong.

A feature of the invention relates to a method of making glass headers for radio tubes and the like, with rigid prongs integrally sealed therethrough, by employing one or more internally recessed glass rings whereby the efficiency of the seal between the glass and the prongs is materially increased.

Other features and advantages not specifically enumerated will be apparent after a consideration of the following detailed descriptions and the appended claims.

In accordance with the invention, the hot glass from a suitable glass melt is drawn continuously from the surface of the melt into a plastic, viscous, ropy rod or cane by an upward pull applied to it by a small piece of previously cooled and solidified glass from the same melt which

2 is wound over a mandrel on which a coil is formed from the ropy cane.

The speed with which the ropy glass is pulled out from the melt, its initial temperature and the composition of the glass, determine the diameter of the cane while it is formed into the glass coil on the mandrel. The mandrel may be made of graphite, or of any alloy which can be used for making molding dies for glass for instance, the molding alloy known under the designation B-100 and manufactured by Crucible Steel Company of America. In accordance with the present invention, the mandrel is provided with at least one longitudinal rib so that the finished coil has at least one angular recess or indentation on its inner periphery for purposes to be described. In one preferred form, the mandrel is polygonal in peripheral contour.

The solid glass coil is taken off the mandrel in convenient lengths and divided into single turns which may be used directly for forming glass headers and simultaneously sealing the pin leads and the tubulation to them.

According to one feature of the invention coils of two different diameters are wound over two corresponding mandrels. The two coil diameters are so chosen that single turns of the smaller diameter coil will fit snugly inside of the assemblies of pin leads previously arranged along circles or polygons in the molding dies on which the sealing and shaping of the headers is performed, while the single turns of the larger coil will fit snugly around and outside the said pin leads.

The molding dies themselves may be disposed on a rotating wheel similar to the one used in the conventional stem machines. In consecutive positions of this machine the pin leads are first fed in, and finally the ready sealed headers sealed to the pins and tubulations are taken off as previously described.

In order to reduce the final waste to a minimum in the cutting of the glass coils into single turns ready for insertion into the header machine, a special method of cutting has been developed. The sharp edge of a high speed wheel of steel is passed along the coil parallel to its axis so as to scratch each of the turns. The single turns are broken off the coil at points where a sharp wheel previously made surface scratches. This method of cutting the single turns of the coil results in a very smooth and evenly breaking surface, and avoids cutting out of the small glass volume which might be lost in cutting the single turns, for instance, by a grinding through process. This in turn facilitates the sealing of the ends of the single turn to themselves during the forming of the header and insures a smooth fit over and inside the lead pins in the sealing mold. Referring to the drawing, Fig. 1 is a view partly sectional, showing the glass coiling method according to the invention.

Fig. 2 is a perspective view of the coiling mandrel with a section of the glass coil thereon, with a stationary feed control plate.

Fig. 2$^a$ is a sectional view taken along the line 2$^a$—2$^a$ of Fig. 2.

Fig. 2$^b$ is a view similar to Fig. 2$^a$, but with a square or rectangular coiling mandrel.

Fig. 2$^c$ is a view similar to Fig. 2$^a$, but with an octagonal mandrel.

Fig. 3 is a partial sectional perspective view of a header formed according to the invention.

Fig. 4 is a partially sectional view showing a die containing lead pins and multiple turns of a glass helix.

Figure 5:
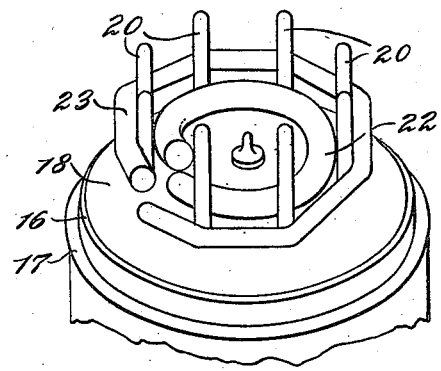

Figs. 5 and 5$^a$ are perspective and sectional views respectively of the preferred form of assembly of glass rings and pins in one of the two parts of the die.

Figure 6:
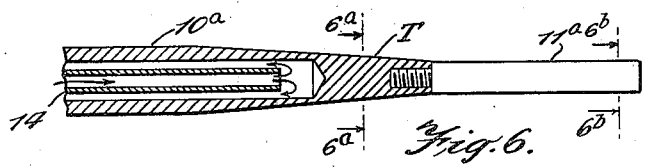
Figure 6A:
Figure 6B:

Fig. 6 is a view, partly sectional, of a water-cooled octagonal coiling mandrel.

Fig. 6$^a$ is a sectional view of Fig. 6, taken along the line 6$^a$—6$^a$.

Fig. 6$^b$ is a sectional view of Fig. 6, taken along the line 6$^b$—6$^b$.

Figure 7:
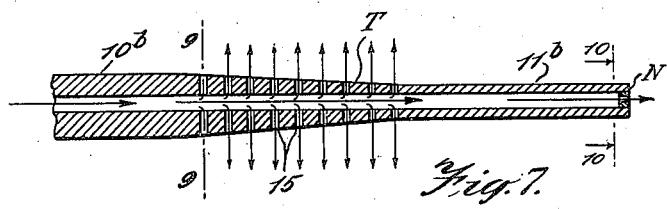

Fig. 7 is a sectional view of an octagonal air-cooled coiling mandrel.

Figure 8:
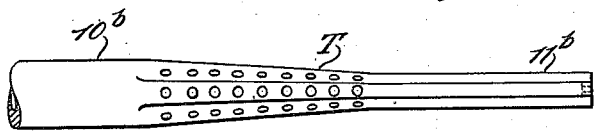

Fig. 8 is a plan view of Fig. 7.

Figure 9:
Figure 10:

Figs. 9 and 10 are respective sections along lines 9—9 and 10—10 of Fig. 7.

Fig. 11 is a sectional view of the two-part mold used in forming the header.

Fig. 12 is a partial view of an automatic machine for carrying-out the method according to the invention.

Fig. 13 is an enlarged detailed view of a portion of Fig. 12.

Referring to Fig. 1, there is shown a furnace 1 of any well-known construction adapted to receive a crucible 2 containing the prepared glass melt or batch 3. Preferably, the crucible is seated on a fire-brick 4 which is heated by a suitable gas jet 5$a$ passing through the opening 5. The top wall of the furnace has an opening 6 through which passes the "pull" 7 in the form of a molten highly viscous glass rod which can be drawn from the melt 3 by immersing the end of a previously cooled and solidified glass rod or cane made from the same melt, and pulling the said rod to form the viscous "pull" 7 of sufficient length so that the latter can be given one or more starting turns around the forming mandrel which is rotated at a predetermined speed in the direction of the arrow. Mandrel 8 is rotated preferably at uniform speed around its longitudinal axis as indicated by the curved arrow, but is not moved along said axis.

In order to solidify the successive turns as they are coiled around the mandrel, and in order to give the turns the proper pitch, preferably the mandrel is water-cooled or air-cooled. This cooling of the mandrel also prevents adherence of the molten glass thereto during rotation thereof. This cooling effect is designed so that each coil turn is cooled to at least a certain amount of rigidity during the period of time corresponding to about one complete turn of the mandrel. Advantage is taken of this solidification of the solidifying coils to cause the latter to be fed longitudinally along the mandrel as indicated by dotted arrow B. For this purpose there is provided adjacent the mandrel a thin plate 9 (Fig. 2) which can be designed as to thickness and can be placed at such an angle with respect to the axis of mandrel 8 so that in conjunction with the rate of cooling of the viscous coils and the rate of rotation of the mandrel the desired pitch and shape of the final solidified coils can be controlled. Preferably the first few turns of the coiled glass are formed around the mandrel by hand and in cooperation with plate 9. The number of initial or starting turns must be large enough to insure an appropriate rigidity to the hand wound turns so that subsequently as the succeeding turns are formed by rotation of the mandrel the hand wound turns cooperate in the nature of a lead-screw with plate 9 to cause them to move bodily as a whole in the direction of the dotted arrow B (Figs. 1 and 2).

When the "pull" 7 first comes in contact with the mandrel 8 after leaving the furnace 1, it is so plastic that it completely takes the shape of the mandrel periphery. After about one complete turn of the mandrel the coil turn becomes rigid enough so that it takes up the torque of the mandrel and executes the motion along the length of the mandrel and at the same time it is sufficiently rigid to resist the gravitational force which tends to flatten the cross section. In order to insure that a positive drive is conveyed from the mandrel to each viscous turn as it is being formed the mandrel is preferably formed with two sections, namely a forming section and a rigid coil receiving section, indicated respectively in Fig. 2 by the numerals 10, 11, and an intervening transition section T. The forming section 10 is larger in cross section than the receiving section 11 and section 10 is provided with longitudinal molding ridges 12, 13, but preferably this ridged formation can be provided by making the mandrel polygonal in cross section as indicated in the sectional views of Figs. 2$^b$ and 2$^c$. The coil receiving section 11 may be circular in cross section as shown in Fig. 6$^b$, it being understood that the two sections 10 and 11 gradually and smoothly merge at the transition region T. Regardless of which kind of mandrel is employed, the coil is formed with at least one recess on its inner periphery. The polygonal section, such as 10$^a$ and 10$^b$, Figures 6$^a$ and 9, enables the individually formed glass coils to be formed on their inner periphery with a corresponding plurality of recesses, each adapted to register or cooperate with a corresponding lead-in. Thus if the finished header is of the standard octal or eight-prong type, the forming section will be octagonal so that the finished coils when individually severed can fit snugly around the eight lead-pins seated in the header forming die to be described.

Instead of having the forming section octagonal, it may be four-sided with slightly concaved sides as shown in the cross-sectional view of Fig. 2$^b$. In the event a substantially circular glass coil is desired the forming section 10 may be circular in cross section but with one or more ribs or keys 12, 13 (Figs. 2 and 2$^a$) to provide the positive drive between the mandrel and the softened glass turn. Likewise if desired, the receiving section 11$^a$ of the mandrel instead of being circular in cross-section may be polygonal such as the octagonal shape 11$^b$ of Fig. 10.

The polygonal form of the mandrel is preferred since it provides the necessary play for the contraction of the glass during the cooling of the coil on the mandrel. In order to allow for continued contraction of the formed glass turns, the forming section 10 is tapered towards the receiving section 11. If desired the forming and receiving sections of the mandrel may be detachably united as by being threaded together as shown in Fig. 6.

In the event the forming section of the mandrel is to be water-cooled, it may be hollow as shown in Fig. 6, and provided with a water inlet tube 14, the water then flowing in the direction of the arrows. If air-cooling is desired the tapered part of the forming section can be perforated and a supply of cooling air is forced through the bore of the mandrel. The cooling air then emerges radially outward through the perforations 15 as indicated in Fig. 7. In any event the outer surface of the mandrel must be smooth enough to allow the formed glass coils to slide lengthwise along it, the cooling of the mandrel preventing any accidental adherence of the coil thereto. The taper of the forming mandrel is so chosen that the contraction of the glass coil during its passage along the cooled mandrel keeps the coil just tight enough to insure the transfer of the torque from the mandrel to the coil without producing undue friction against the axial movement of the coil.

Figure 5A:
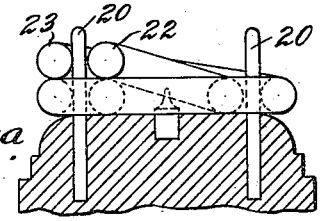

Referring to Figs. 5, 5a and 11, there is shown a typical header forming die using the inner and outer glass coils or rings produced by the foregoing described method. The male part of the die is shown in Figs. 5 and 5a and is formed with two stepped cornered shoulders 16, 17, and a rounded shoulder 18. The female part of the die is shown in the upper portion of Fig. 11. The flat upper face 19 is provided with a series of recesses, arranged in the path of a circle or polygon, into which the lead pins 20 are loaded. Preferably the face 19 has a central pointed or tapered projection 21 cooperating with corresponding parts 19a and 21a on the female die member for forming a rudimentary exhaust tubulation 54a (Fig. 3.) A glass coil 22 of approximately the same outer diameter as the circle circumscribed by the inner margins of the lead pins, is dropped in place. Then another, but larger, glass coil 23 is dropped around the pins as shown in Figs. 5 and 5a. Each corner on the inner periphery of the glass coil registers with and partially surrounds a corresponding one of the pins as shown more clearly in Fig. 13. A complementary female die with openings to receive the projecting pins 20 is placed over the assembly of Figs. 5 and 5a and the glass coils 22 and 23 are heated to approximately 900° C. by burners as shown in Fig. 11, rendering them plastic, whereupon the two parts of the die are subjected to pressure thus forming a substantially cup-shaped header with the pins 20 rigidly fastened therein with portions extending from opposite sides of the header as shown in Figure 3.

I have found that in the actual making of the headers on automatic machines, where the molding mechanism and its related parts are subject to rotation during the heating and molding stages, that the provision of one or more recesses on the inner periphery of each coil is of great importance in achieving the best results. This shaping may take the form of an indentation produced by the rib 12 during the actual winding of the glass coil; or it may take the form of an angle 30 when the coils are wound on a polygonal mandrel. This is of greater importance in connection with the outer coil 23a (Fig. 13). During and preceding the actual molding steps, the glass rings are subjected to as uniform a melting heat as possible, and for that purpose it is desirable to rotate the rings. In order to accomplish this object on automatic machinery of conventional construction, it is necessary to rotate the mold members during the heating of the glass rings. However, if the glass rings are of simple circular form the rotation of the mold may not impart the desired amount of rotation to the glass rings, with the result that the glass rings may not be uniformly subjected to the flames 45, 46, 47 (Fig. 13). Furthermore, in order to insure the proper "working" of the molten glass prior to the final molding stage, I have found it desirable to rotate synchronously both halves of the mold. If the glass ring is merely circular, slippage may occur between it and the pins. However, when the outer glass ring 23a is of polygonal shape, each of the angular indentations on the inner periphery registers with one of the corresponding pins 20 and partially surrounds it, with the result that when the mold is rotated, it effects a positive driving connection with the glass ring 23a. Another reason why this is of importance is that the glass rings have the characteristics of springs so that when they are heated, they tend to open up or increase their diameter. However, in the case of the inner glass ring 22a, this opening-up characteristic effects a pressure between the expanding glass ring and the pins 20 which is sufficient to provide the necessary positive frictional drive to the said ring 22a. As an added precaution against slippage between the outer ring 23a during the rotation of the mold, a spring-pressed roller 40 may engage the outer periphery of the ring 23a as the latter is being heated.

Referring to Fig. 12, there is shown in diagrammatic form, a portion of an automatic machine for forming the headers according to the invention. It consists in general, of an intermittently rotating table or reel R, carrying a plurality of rotatable spindles 48 which are mounted for individual rotation. Each spindle 48 has fastened thereto a sprocket wheel 49 which engages the continuously rotating sprocket chain 50, whereby the spindles are maintained in continuous rotation while the reel R is intermittently rotatable. Each of the spindles 48 carries the lower or male die member 51 and the upper female die member 53 is shown in detail in Fig. 11. Normally, each pair of die members 51 is mechanically coupled to its associated sprocket wheel 49 by a friction disc clutch 52 of any well-known construction.

In Fig. 12, four successive stations or positions of the reel R are shown. It will be understood of course, that a number of preceding stations are provided in one of which for example, the metal pins 20 can be inserted or loaded into the openings in the mold 51; and at other stations the mold and the glass rings can be subjected to preheating by suitable burners which may be stationary and attached to the frame in which the reel R rotates. In station A, the burners provide sufficient heat to render the glass rings 22a and 23a partially soft, and by a suitable timing cam (not shown), the upper die member 53 can be lowered for a short period before reel R is indexed to its next station. In station B, the heat is increased, and the pressure roller 40 engages the ring 23a before the upper die member is lowered to prevent it springing outward and to maintain it in contact with the pins as shown more clearly in Fig. 13. As a result of this pressure, the outer ring 23ª, is partially molded around the pins. Then the upper rotating die member is lowered into pressing engagement with the softened ring. In station C, additional heat is provided so that the glass rings assume their viscous condition. In Fig. 12, for the purpose of simplicity, only the male portions of the die are shown at stations A, B, and C. It will be understood that the female die members 53 which are maintained in synchronous rotation with the cooperating die members 51, and are lowered so that at stations A, B and C, the glass is subjected to a pre-pressing operation prior to the final pressing or molding operation at station D. In station D, the clutch 52 is thrown out by any suitable throw-out projection (not shown), thus rendering the die members stationary, at the same time, the female die 53 mounted adjacent station D, is brought down into molding pressure relation with the molten glass rings whereby the latter are pressed to form a solid substantially flat member 54 through which the prongs 20 are transversely and rigidly sealed in a vacuum-tight manner. At the same time, because of the shape of the skirt 55 on the female die 53 in cooperation with the corresponding portions of the male die 51, the flat glass body is formed with an integral tapered glass skirt or flange 56, as shown in Fig. 3. It will be understood of course that it is not necessary that the member 54 be formed with the skirt 56. It will also be noted that as a result of the recesses 57 in the die member 53, the glass header 54 is also formed with integral beads 58 surrounding each pin 20 Fig. 3, so as to increase the mechanical rigidity of the connection between the pins and the header.

Then the exhaust tubulation may be sealed to the central portion of the header 54 in the usual manner.

While in the foregoing description the invention has been illustrated in connection with a header for an electron tube, it will be understood that the invention is equally well applicable to headers for lamp bulbs and the like, or in connection with any device which is required to have one or more metal inserts sealed therethrough so as to be rigidly united to the glass. Furthermore, while the invention finds its immediate practical utility in connection with electron tube headers of the rigid pronged or rigid lead-in type, it will be understood that the invention is also applicable where the lead-ins are in the form of thin flexible wires. Furthermore, while the header is disclosed as constituting the closing member of an evacuated bulb, it will be understood that it can be used as a contact base for attachment to an otherwise completed lamp or bulb. Various other changes may be made without departing from the spirit and scope of the invention.

It will be clear from the foregoing description that the glass blanks may be used either as single turn coils or as plural-turn coils, Figure 4, depending upon the thickness that is desired in the finished header. Likewise, while it has been mentioned that the header may be formed from glass coils of substantially the same cross-sectional diameter, it will be understood that one or more coils may be of larger diameter than the rest depending upon the contour that is desired in the finished glass header. Furthermore, instead of employing glass coils made from blanks of substantially the same softness characteristics, e. g., so-called "soft" glasses, it will be understood that the coils may have different degrees of softness or hardness so as to form a graded softness or hardness in different parts of the glass header. Thus, relatively "hard" glass coils may be used where the rigid metal prongs are to be sealed and a "soft" glass coil may be used at the center to enable a soft glass exhaust tubulation or the like to be readily sealed thereto. Likewise, the outermost coil may be of a different hardness characteristic in the event that the glass header is to be sealed directly to a metal bulb or the like. Furthermore, glass headers such as those described can be made by using only a single rigid turn or ring of the glass helix formed as above described. This single turn, preferably in the form of a polygon e. g., ring 23ª, may encircle the polygon on which the lead-in wires are arranged and the encirclement may be either interiorly of the lead wires or exteriorly thereof. In that case it may be necessary to employ a plurality of succeeding pressing and molding operations so as to make sure that a uniform sealing of the glass to the lead-in wires is effected.

This application is a continuation-in-part of application Serial No. 365,198, filed November 12, 1940 (issued as Patent No. 2,342,609), and application Serial No. 426,970, filed January 16, 1942. The glass coil or coils, used in the molding operations described and claimed in this application, are described and claimed in my application Serial No. 754,926, filed June 16, 1947.

What I claim is:

1. The method of making glass headers for electron tubes and the like which comprises assembling a ring of glass, formed in a plastic state as a helix with at least one recess, in concentric relation with a series of metal pins so supported that at least one pin is in registry with a recess, rotating said assembled ring and pins while heating and thus softening the ring, and molding the ring into a substantially flat glass member through which the pins are rigidly sealed.

2. The method of making glass headers for electron tubes and the like employing a glass ring with a series of internal recesses on its periphery, which comprises telescoping the ring over a series of lead-in conductors with each conductor in registry with a corresponding recess, and subjecting the ring to molding heat and to molding pressure to form it into a substantially flat solid body with said lead-in conductors extending transversely therethrough.

3. The method of making glass headers for electron tubes and the like which comprises, assembling a polygonal glass ring with relation to a plurality of lead-in conductors so that each conductor is in registry with a corresponding interior angle of the polygon and subjecting the ring to molding heat and to molding pressure while rotating the pins and ring to form the ring into a substantially flat solid body with said lead-in conductors extending transversely therethrough.

4. The method of making glass headers for electron tubes and the like which comprises, assembling a series of rigid contact pins in a holder, assembling on said holder an open-ended glass ring having an internal recess in registry with each of said pins, heating the glass ring to soften it while rotating said holder, the engagement of each pin and its recess serving to provide a positive drive from said holder to said ring.

5. The method of making glass headers for electron tubes and the like which comprises, assembling a series of rigid contact pins in one member of a multiple section die, positioning a polygonal glass ring on said die member so that the interior angles are in registry with respective pins, subjecting the ring to heat to soften it, rotating said member during said heating, the engagement between said pins and said interior angles serving to impart positive rotation to said ring while it is being heated, and subjecting the melted ring to a molding pressure to form it into a substantially flat body with said pins extending transversely therethrough.

6. The method according to claim 5 in which said ring is subjected to successive heating and molding stages, at least one of said stages being a preliminary stage wherein the sections of the die are rotated synchronously, and another of said stages is the final stage in which both die members are stationary so far as rotation is concerned, but are pressed together to mold the header to its flat shape.

7. The method of making glass headers for electron tubes and the like which comprises, assembling a series of metal pins parallel to each other around a common center, positioning an open-ended glass ring substantially concentric with said pins, rotating said pins around said center, said ring having peripheral recesses in registry with said pins, whereby rotation of the pins provides a positive drive to rotate said recessed ring.

8. The method of making glass headers for electron tubes and the like which comprises, supporting a series of metal pins symmetrically around the center of a holder, placing a substantially circular glass ring within the boundary of the pins, placing a polygonal glass ring around the pins so that the polygonal angles register with respective pins, and subjecting both rings to molding heat and pressure to form them into a molded unitary and substantially flat glass member through which the pins are rigidly in a vacuum-tight manner.

BENNETT S. ELLEFSON.

REFERENCES CITED

The following references are of record in the file of this patent:

UNITED STATES PATENTS

| Number | Name | Date |
|---|---|---|
| 2,030,185 | Rose | Feb. 11, 1936 |
| 2,251,726 | Wellech et al. | Aug. 5, 1941 |
| 1,679,437 | Middendorf | Aug. 7, 1928 |
| 2,312,003 | Schneider et al. | Feb. 23, 1943 |
| 2,195,485 | Franke | Apr. 2, 1940 |
| 2,296,321 | Wellech | Sept. 22, 1942 |
| 1,574,482 | Hirsch | Feb. 23, 1926 |
| 2,342,609 | Ellefson | Feb. 22, 1944 |
| 1,301,714 | Kueppers | Apr. 22, 1919 |
| 2,177,743 | Pfaff | Oct. 31, 1939 |
| 2,209,739 | Meyer | July 30, 1940 |

FOREIGN PATENTS

| Number | Country | Date |
|---|---|---|
| 154,609 | Germany | Oct. 4, 1904 |